US007627557B2

(12) United States Patent
McRoberts et al.

(10) Patent No.: US 7,627,557 B2
(45) Date of Patent: Dec. 1, 2009

(54) COMPUTERIZED ASSISTANCE CONTENT ORGANIZATION, SCOPING AND BIAS

(75) Inventors: J. Shane McRoberts, Seattle, WA (US); Amit Rai, Seattle, WA (US); Christopher McConnell, Redmond, WA (US); Dale Rogerson, Seattle, WA (US); Kipper York, Seattle, WA (US); Scott Whalley, Seattle, WA (US); Tom Laird-McConnell, Bellevue, WA (US); Wenlong Dong, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 325 days.

(21) Appl. No.: 11/167,840

(22) Filed: Jun. 27, 2005

(65) Prior Publication Data

US 2006/0294070 A1 Dec. 28, 2006

(51) Int. Cl.
*G06F 7/00* (2006.01)
*G06F 17/30* (2006.01)
*G06F 3/00* (2006.01)

(52) U.S. Cl. .............................. 707/3; 715/713; 715/714
(58) Field of Classification Search ....................... 707/3
See application file for complete search history.

(56) References Cited

U.S. PATENT DOCUMENTS 5,694,559 A * 12/1997 Hobson et al. ............... 715/705

7,454,706 B1 * 11/2008 Matthews et al. ........... 715/713
2002/0188612 A1 * 12/2002 Yu et al. ...................... 707/100

OTHER PUBLICATIONS

"Introducing Windows "Longhorn" Help",(http://msdn.microsoft.com/library/en-us/htmlhelp/html/hwmscIntroducingWindowsLonghornHelp.asp), Nov. 21, 2003, 1-3.*
"Microsoft "Longhorn" Help Highlights", (http://www.winwriters.com/articles/longhorn/), Feb. 3, 2004, 1-5.*

(Continued)

*Primary Examiner*—Jean B. Fleurantin
*Assistant Examiner*—Aleksandr Kerzhner
(74) *Attorney, Agent, or Firm*—Westman, Champlin & Kelly, P.A.

(57) ABSTRACT

Computer assistance content related to a plurality of software entities is combined into a single assistance content corpus. The corpus may be organized hierarchically. The hierarchical organization can be done using content sets that relate assistance content with associated metadata. Content sets can be related to each other in parent-child relationships. The relationship definitions can be separate from the content set definitions. Scope and bias information can be used to constrain assistance content searching over the corpus and to bias search results based on one or more state variables of the user's computer. A remote assistance server can be used to provide updated or newer assistance content to the user. When the remote assistance server is used, an assistance request from the user is supplemented with scope information.

12 Claims, 8 Drawing Sheets

OTHER PUBLICATIONS

"About Help URIs", (http://longhorn.msdn.microsoft.com/lhsdk/help/hacaboutpuris.aspx), Nov. 21, 2003, 1-2.*

"Microsoft Computer Dictionary", Jan. 1, 2002, Microsoft Press, Fifth Edition, 539.*

"Programming Windows Help", Shane McRoberts, Microsoft Professional Developers Conference 2003, Oct. 26-30, 2003, Los Angeles, CA.

"The Latest from Microsoft's Kitchen: Longhorn", Ljnbomir Spasovski, The Newsletter of the Chicago Windows User Group, vol. 1, Issue 4, 2003.

"Introducing Windows "Longhorn" Help", http://msdn.microsoft.com, Nov. 21, 2003.

"Help 2 TOC Plug-in Update", Microsoft Corporation, Jul. 2004.

* cited by examiner

COMPUTERIZED ASSISTANCE CONTENT ORGANIZATION, SCOPING AND BIAS

BACKGROUND

As computing systems provide more and more functions, it is increasingly important that the sheer complexity of such systems does not intimidate or alienate users. Many times, a user simply does not have the resources or time to obtain in-depth training in order to take advantage of all of the functions that a given computing system or even a single piece of software can perform. Thus, the design of software for modern computing systems often strives to provide user friendliness and an intuitive user interface. However, no degree of user friendliness or intuitive user interface design can accommodate all of various operations that all computing users would wish to perform. Accordingly, virtually all software applications and operating systems are provided with some form of computerized assistance content. Thus, when a user does not know how to perform a given operation, he or she can request help and an interface is provided from which the user can select or search among help topics.

The provision of assistance content is a very important aspect of the user experience for modern computing systems. By definition, users will request help once they have resigned themselves to the realization that they simply do not know how to do what they want to do on the computing system. This situation is frustrating. It is important, then, that the assistance be provided to the user quickly, and that the content be as relevant as possible to the user's situation.

Computerized assistance content has generally been provided in relation to a specific software environment. For example, an operating system is generally shipped with assistance content to help users in interacting with the operating system. Individual software applications for use with the operating system are often shipped with their own application-specific assistance content. Typically, a user requests help by selecting a "help" tab on a computer screen, or pressing a "help" button on an input device. Generally, the software entity with which the user is currently interacting, such as an application or operating system, will respond to the help request with a user interface from which the user can select or search among assistance content for that software entity. This approach is sometimes limited in that a user may not know that his or her question, being directed to the current software entity, may be better answered by assistance content available from another software entity. For example, if a user is interacting with a graphics software package, and wishes to perform a function such as installing an additional font, the user would likely press or request help. The graphics software package would respond to the help request and provide the user with an assistance interface. The user would interact with the interface to try to find topics related to "adding a font" but such content, even if available, may not be particularly relevant to the user's specific question. In contrast, had the same query been directed to the operating system, much more relevant content may have been found.

As modern computing systems continue to provide a wider array of features and functions to users thereof, it is increasingly important that computerized user assistance be done as quickly and accurately as possible. More efficient computerized user assistance is believed to enhance the overall user experience and provide more and more users with more effective access to enhanced features and functions of such modern computing systems.

SUMMARY

Computer assistance content related to a plurality of software entities is combined into a single assistance content corpus. The corpus may be organized hierarchically. The hierarchical organization can be done using content sets that relate assistance content with associated metadata. Content sets can be related to each other in parent-child relationships. The relationship definitions can be separate from the content set definitions. Scope and bias information can be used to constrain assistance content searching over the corpus and to bias search results based on one or more state variables of the user's computer. A remote assistance server can be used to provide updated or newer assistance content to the user. When the remote assistance server is used, an assistance request from the user is supplemented with scope information and/or bias information.

DETAILED DESCRIPTION OF ILLUSTRATIVE EMBODIMENTS

Figure 1:
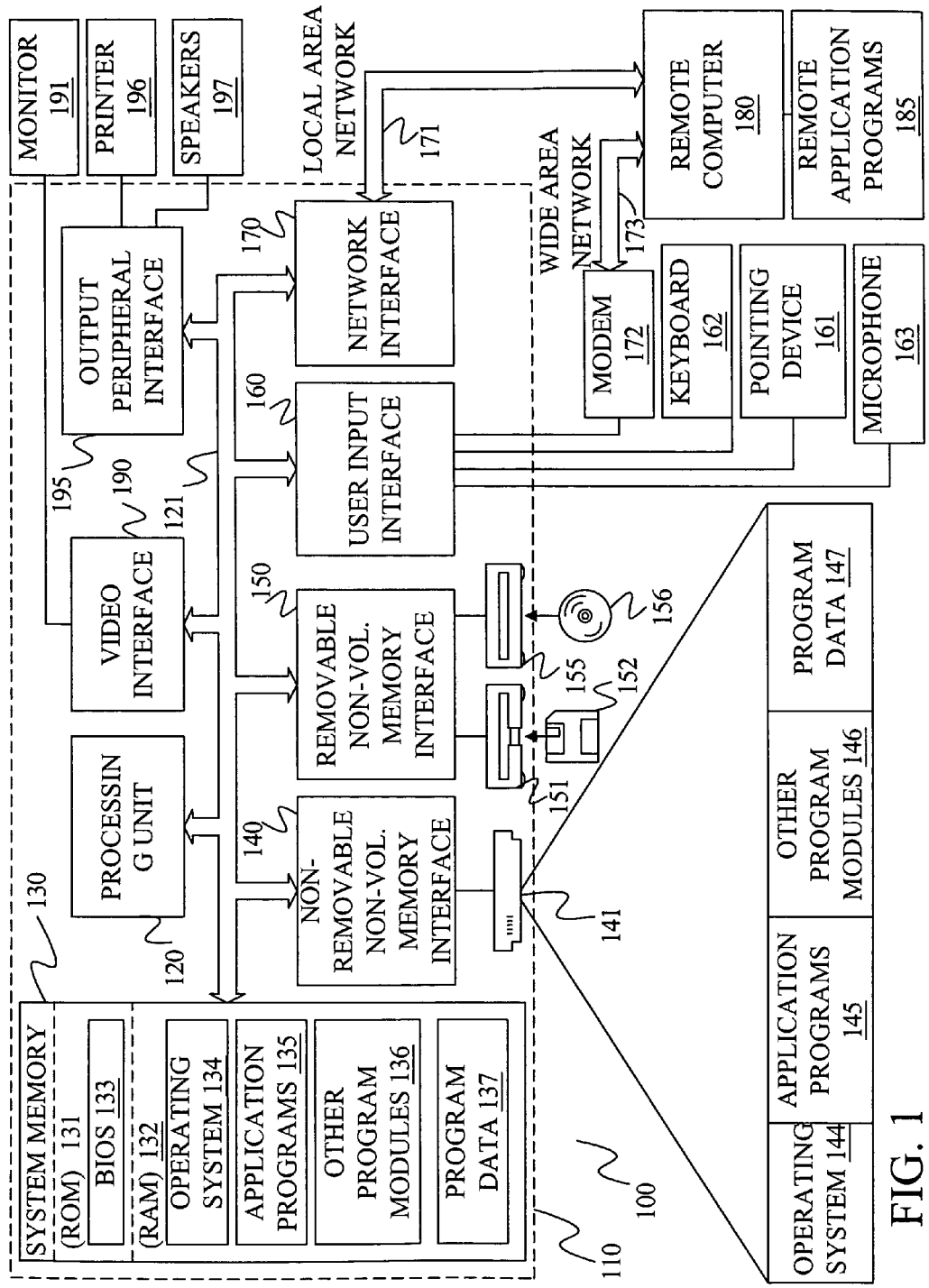
FIG. 1 is a block diagram of one computing environment in which embodiments of the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purposes or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
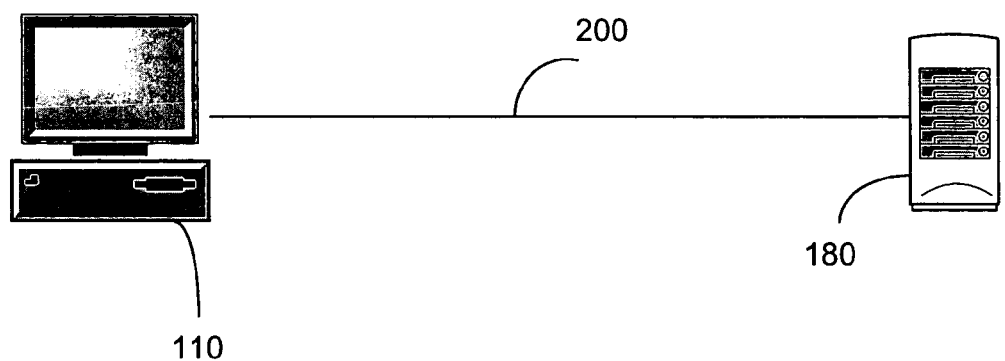
FIG. 2 is a block diagram of a computing environment in which embodiments of the present invention may be practiced.

FIG. 2 is a simplified diagrammatic view of a portion of the computing environment illustrated in FIG. 1. In particular, FIG. 2 illustrates a client-server relationship between computer 110 and remote computer 180. Remote computer 180 functions as a server and will generally service many such computers 110 through their associated connections 200. Generally, server 180 will respond to a request from one or more computers 110 to provide information to that computer. This client-server relationship allows for centralized data and processing to be performed on relatively higher performance computers in comparison to client devices, such as computer 110. Moreover, the ability of server 180 to act as a centralized source of data simplifies many data operations.

Link 200 can take any suitable form and may represent any number of sub-links interconnected together. The sub-links may have different physical layers and/or network protocols. Thus, any arrangement of physical layers and data protocols that can be combined to convey information between computer 110 and server 180 can be considered to be link 200.

Figure 3:
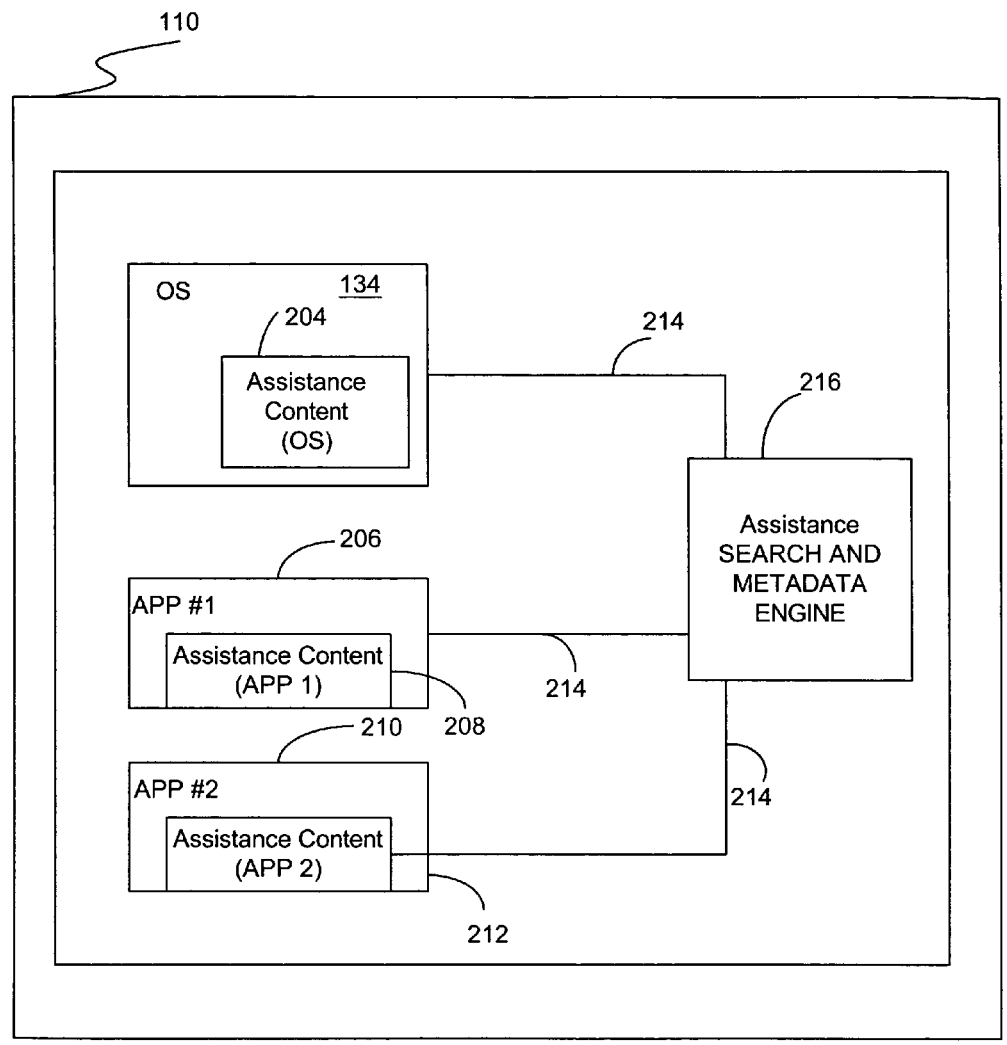
FIG. 3 is a diagrammatic view of a computing device configured to provide assistance in accordance with an embodiment of the present invention.

FIG. 3 is a diagrammatic view of operating system 134 and application programs 206, 212 residing on storage media 202 within, or coupled to, computer 110. Storage media 202 can take the form of any media capable of storing data, including, but not limited to, media within hard drive 141, disc drive 151, optical disc drive 155, or any combination thereof. Operating system 134 is stored on storage media 202 and includes operating system assistance content 204. Application program 206 also resides upon storage media 202 and includes its own application specific assistance content illustrated diagrammatically at reference numeral 208. Application program 210 is also stored on storage media 202 and includes its own application-specific assistance content 212. In accordance with one broad aspect of embodiments of the present invention, all assistance content related to the operating system and any or all installed program applications, and any other assistance content that may be desired or later added, is considered to be part of a single assistance content corpus. Pointers, links, or other suitable structures 214 relate or otherwise couple all of the assistance content to a query handling facility, such as assistance search and metadata engine 216. Embodiments can be used to query assistance content metadata, perform text-based searching, as well as any combination of the two. Additionally, both user-entered and automated queries (both textual and metadata) are supported by the embodiments described herein.

This change in the conceptualization of assistance content, from relatively insular files associated with specific software entities, to elements of an overall assistance corpus provides a host of new features and strengths for the provision of assistance content. For example, a user interacting with a word processing program may wish to add a new font to the document with which he or she is working. The user may not know that the function of adding a font is more germane to operating system functions and would be better addressed by the operating system. However, when the user issues the help request or query to assistance search and metadata engine 216, all available assistance content is queried relative to the user's query. Although the word processing application with which the user is interacting may have some slightly relevant material, a better match by the operating system may generate higher-ranked assistance content in response to the user's request. Accordingly, the user is provided with more relevant assistance content without requiring the user to know which software entity could best respond to the help request.

Figure 4:
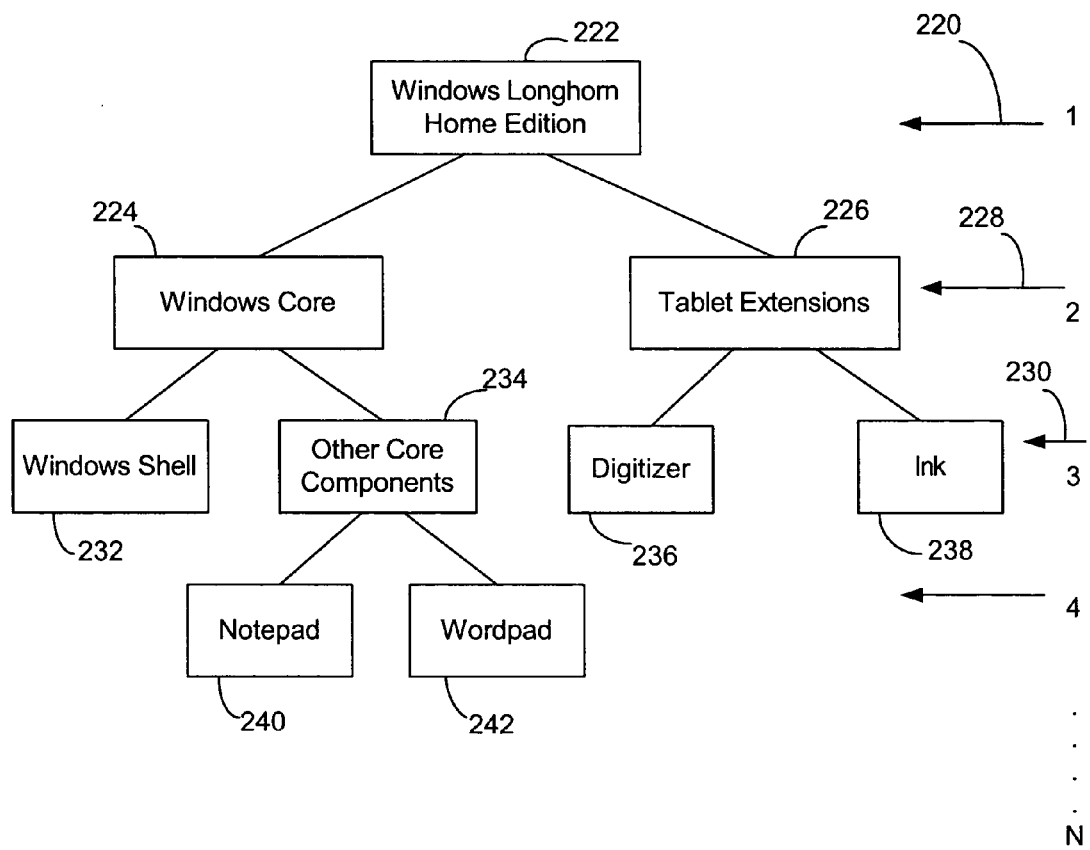
FIG. 4 is a diagrammatic view of hierarchical assistance content organization in accordance with an embodiment of the present invention.

In order to improve assistance content organization, as well as provide an extensible structure within which additional content can be added, assistance content is preferably organized in a hierarchical manner. FIG. 4 is a diagrammatic view of an exemplary hierarchical organization of assistance content in accordance with an embodiment of the present invention. At the top, or root, level, indicated by arrow 220, root node 222 is created. In the example illustrated in FIG. 4, root node 222 is the top level of the hierarchy and is illustrated as Windows Longhorn Home Edition. Top level node 222 has a pair of children 224 and 226 at scope level 228. Child 224 is entitled "Windows Core" and is the top-level hierarchical node for Windows-Core related assistance content. In contrast, child 226 is labeled "Tablet Extensions" and is at the same scope level as child 224. Child 226 is the top node for assistance content related to all tablet extensions within the Windows Longhorn Home Edition. Child 224 has a pair of children at scope level three illustrated at reference numeral 230. Specifically, child 224 has children entitled "Windows Shell" 232 and "Other Core Components" 234. Similarly, child 226 includes a pair of children at scope level three. Specifically, "Digitizer" child 236 and "Ink" child 238 are children of tablet extensions child 226. Finally, FIG. 4 illustrates "Other Core Components" child 234 having a pair of children at scope level four. Specifically, "Notepad" child 240 and "Wordpad" child 242 are children of "Other Core Components" child 234. Each point in the hierarchical tree can be considered a "node." This hierarchical organization of assistance content facilitates the use of scoping and biasing of assistance content in accordance with embodiments with the present invention.

Figure 5:
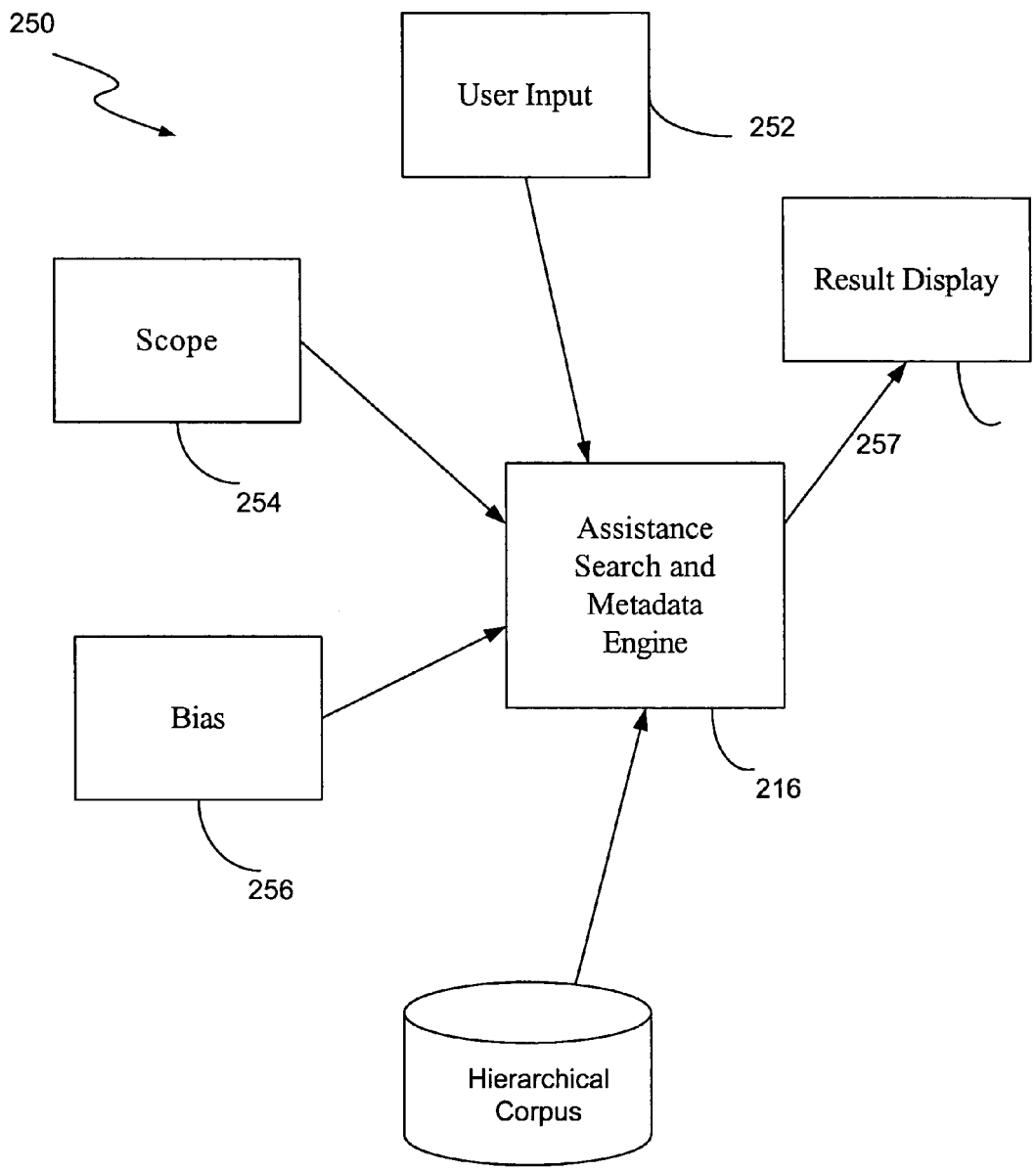
FIG. 5 is a diagrammatic view of an assistance search engine receiving configured to receive information relative to a user assistance request and display search results.

FIG. 5 is a diagrammatic view of a system for providing computerized assistance in accordance with an embodiment of the present invention. System 250 includes assistance search and metadata engine 216. Engine 216 is preferably implemented in program instructions that cause a computing device to perform query engine functions. Search and metadata engine 216 can employ any suitable search or metadata query algorithms now known or later developed. Engine 216 receives input 252, which is generally an assistance query generated by the user, but could also be a text or metadata query generated programmatically. The query may be in the form of natural language, Boolean operators, or any combination thereof. Additionally, the user query may include data typed by the user, or otherwise entered into a user-input device such as, for example, by using speech recognition. Assistance search and metadata engine 216 also receives scope input 254. The scope input defines the level in the hierarchical corpus of assistance content that will be the search space for the query. Preferably, an initial user query is provided with a top level scope such that the search space for the query will be the entire corpus of a user's local machine. Assistance search and metadata engine 216 is also coupled to a source of bias data 256 that can be used to weight or otherwise influence search results based upon selected factors. For example, if a user issues a help request while interacting with a particular software application, such as a word processor, then bias may include an indication that the user is interacting with the word processing application. This bias data can be used to help ensure that search results corresponding to that particular word processing application have their relevance scores arbitrarily increased. Nevertheless, a very strong search result "hit" from another part of the search space could still end up being ranked higher than a medium hit from the particular software application.

The query results from assistance search and metadata engine 216 are displayed to the user via result display 257. Preferably, the result display also provides an indication of the scope level at which the search was performed. Additionally, the user can be provided with an option to re-execute the search with a different scope level. For example, a user who receives too many search results that do not appear to be of particular relevance may wish to reduce the search space by reducing the scope of the search. Thus, referring back to FIG. 4, a user issuing a help request within the Notepad application, may later decide to narrow the scope and re-execute the search at scope level two indicated at arrow 228. The search space for the re-executed search would be confined to node 224 and all children therebelow.

Figure 6:
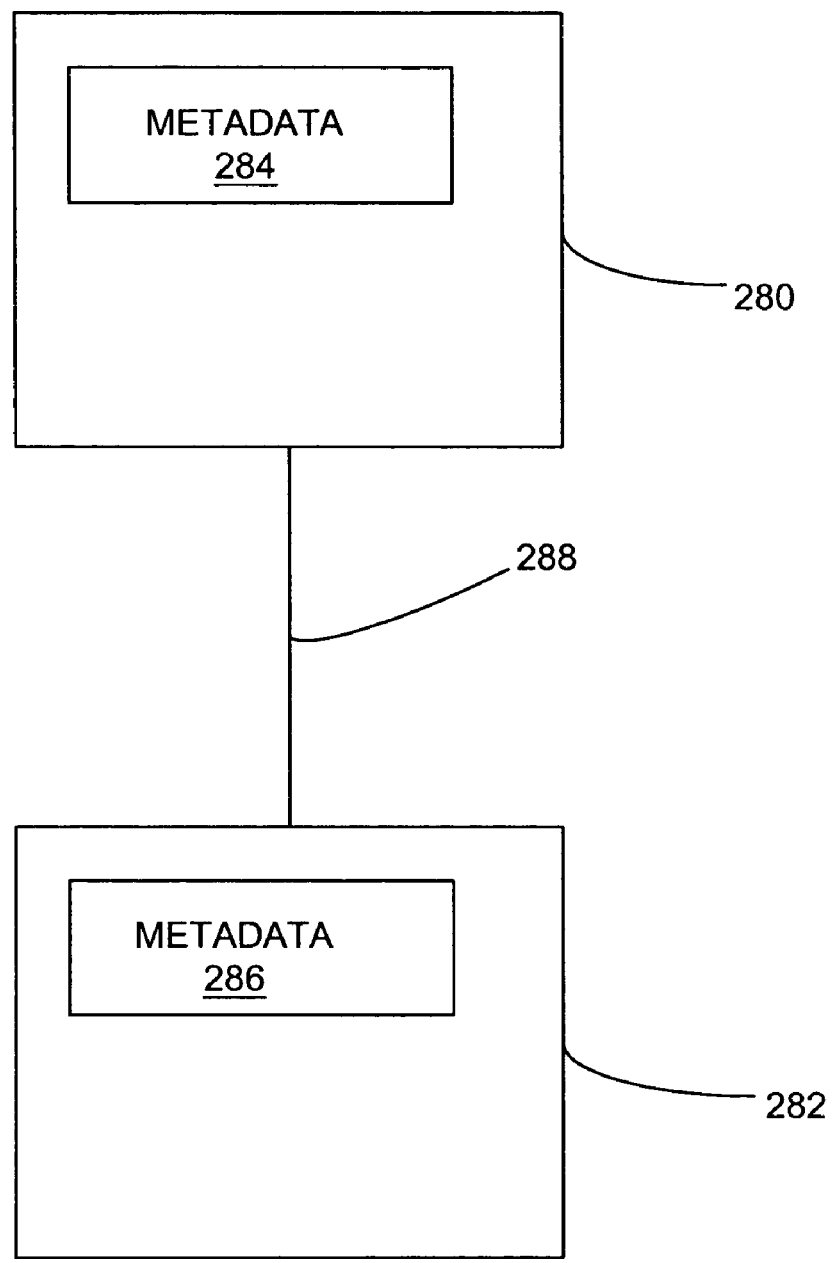
FIG. 6 is a diagrammatic view of assistance content sets related to one another and having metadata in accordance with an embodiment of the present invention.

The hierarchical organization of assistance content is preferably effected using collections called "content sets." Referring back to FIG. 4, each content set can be considered a node of the hierarchy. A content set, as used herein, is any data structure or representation capable of grouping assistance content, and metadata related thereto. FIG. 6 is a diagrammatic view of a pair of content sets that are related together. Content set 280 is related to content set 282. More particularly, content set 282 is a child of content set 280. A content set can have any number of children, including zero.

Content sets 280 and 282 preferably include metadata 284 and 286, respectively. The metadata preferably helps tailor the user experience relative to the content set and preferably defines one or more sources for the assistance content. Metadata can include reference to an experience or session file that defines the default user experience for the content set. The metadata can also include a list of query handling facility references that define the list of search or query sources as well as a prioritization of the sources to use for the content set. For example, a given content set may have a first priority query handling facility that is based on a server disposed remote from the user's client. Server-based assistance provides many benefits in the provision of computerized assistance content, and will be described in greater detail later in the specification. Additionally, the metadata may list a second priority query handling facility that is based on the user's local machine. Thus, if connection to the first priority query handling cannot be achieved, the assistance can be provided using a query handling facility resident on the user's local machine. For each facility listed in the metadata, the metadata may also include additional information, if any, required to identify specific sources, such information may include, but is not limited to, a uniform resource identifier (URI) that specifies a server for online content.

Preferably, the definition of a relationship between content sets is separate from the definition of the content sets themselves. A content set definition, illustrated diagrammatically at 288 is preferably a data structure, or other representation definition, that specifies a parent content set as well as one or more child content sets that will be considered children of the parent content set by virtue of the definition. Since the definition of relationships between content sets is wholly separate from the definitions of the content themselves, it is relatively easy to specify situations in which a given content set may be a child of any number of parent content sets. Moreover, the structure is easily extensible to new content sets that are later developed or provided. This allows flexibility of content set relationships and provides a means of reusing content sets as children of other content sets, even when both child and parent may have been released and installed on a machine before the relationship was defined (i.e. only a new relation needs to be added).

Figure 7:
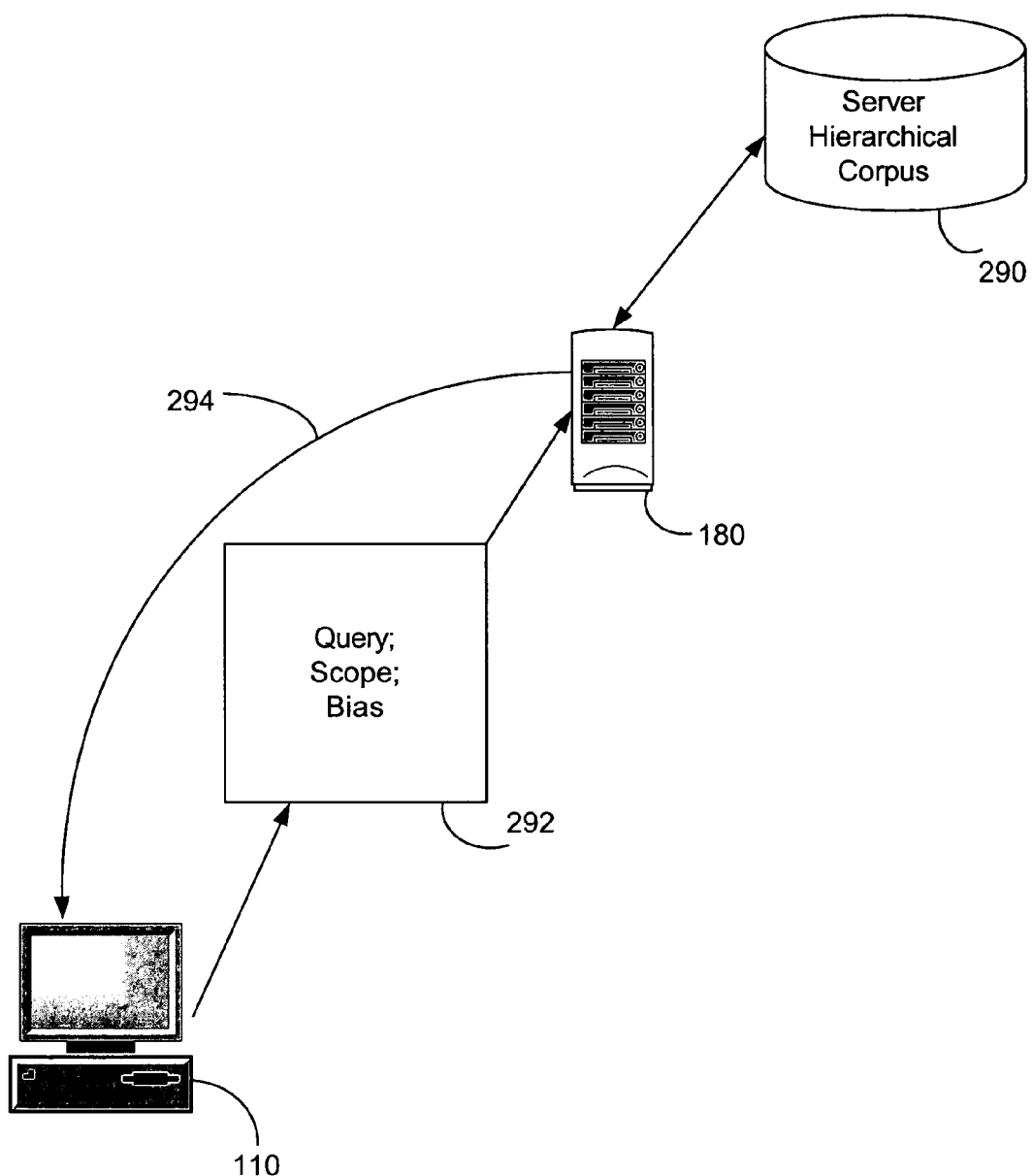
FIG. 7 is a diagrammatic view of assistance content being provided in a client server environment in accordance with an embodiment of the present invention.

Embodiments of the present invention are particularly useful for the provision of server-based assistance content. The flexible and extensible model described above, can be used to take advantage of server-based assistance content delivery when available. FIG. 7 is a diagrammatic view of computerized assistance implemented in a client-server environment. Client computer 110 has a local assistance corpus (not shown in FIG. 7) disposed thereon. However, since client 110 is operably coupled to assistance server 180, assistance requests will preferably be provided to server 180 instead of performed locally. This ensures that any updates to the assistance content that have been made since the local assistance corpus on client computer 110 was generated can be viewed by the user with virtually no administrative overhead. Thus, the new content need not be pushed to each and every client computer. FIG. 7 illustrates a situation wherein assistance server 180 is coupled to, or otherwise includes, server hierarchical corpus 290 that is a superset of the local assistance corpus disposed within or coupled to client computer 110. For example, server hierarchical corpus 290 may include other software products and/or operating systems that may not be installed or used on local computer 110. Further, since a given software product may have various versions, server corpus 290 may include assistance content tailored or specific to each and every version.

When client 110 issues the assistance request, the request preferably includes three components. First, is the query itself which may be in any suitable form. Additionally, the search request also preferably includes scope information such that the search space within server hierarchical corpus 290 can be limited to assistance content potentially relevant to client computer 110. For example, local machine 110 may run an operating system version 10 having a number of components or applications installed therewith. It is often possible for a user to upgrade a given component, such that the component has a newer version than the operating system version itself. Additionally, users may install additional applications. Thus, the scope information could be specified as operating system 10. However, additional scope information can also be specified relative to software component versioning, etc. Additionally, the help request also preferably includes bias information. This information may be as simple as an indication of the current software application with which the user is interacting. However, the bias information can take the form of other suitable content related to the current or recent state of client computer 110. Server 180 receives the help request 292 and executes a search among server hierarchical corpus 290 constrained by the search request 292. The search results are then provided to client computer 110 illustrated diagrammatically at reference number 294.

Figure 8:
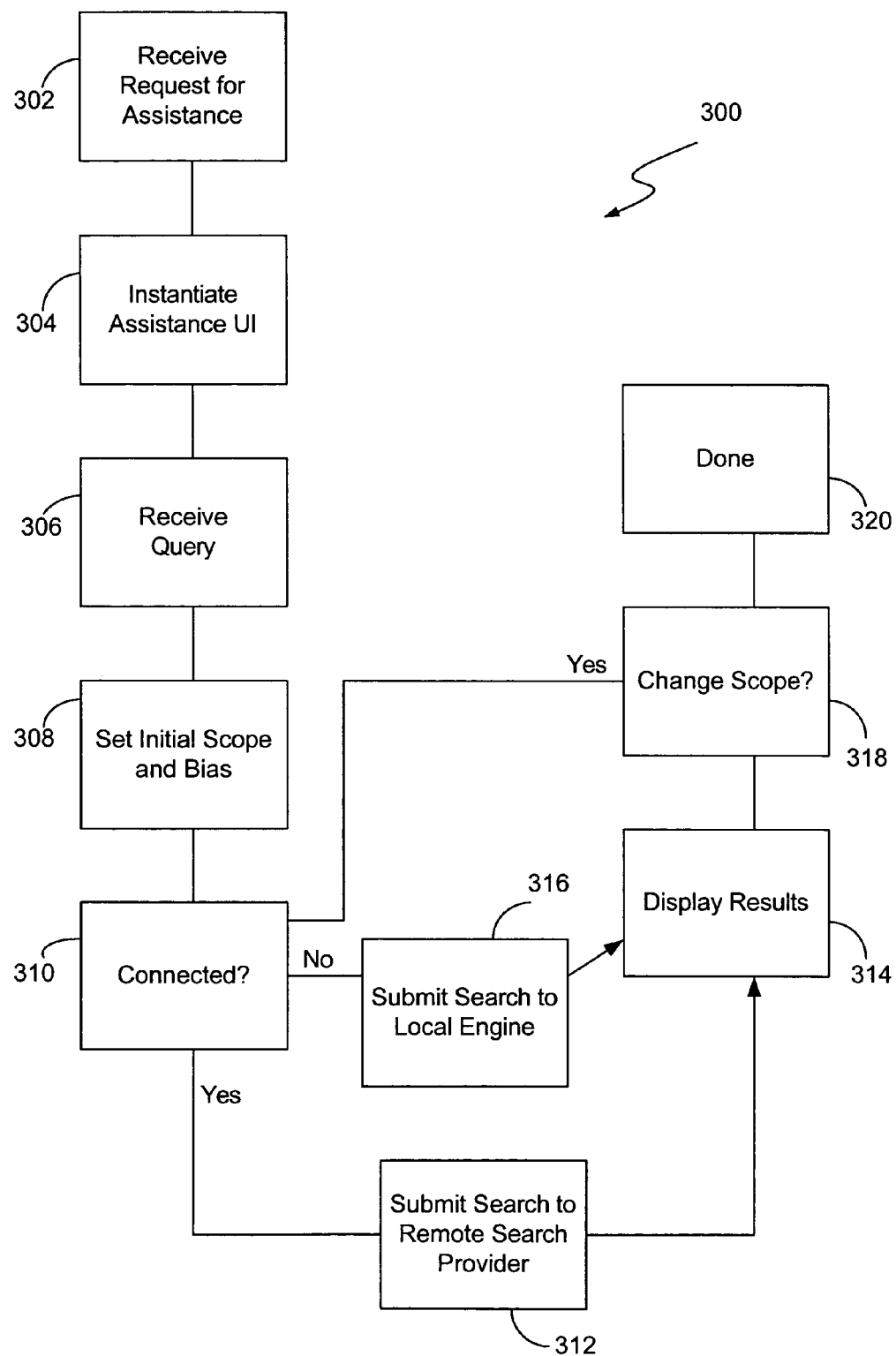
FIG. 8 is a flow diagram of a method of providing assistance content in accordance with an embodiment of the present invention.

FIG. 8 is a diagrammatic view of a method for providing computerized assistance content in accordance with an embodiment of the present invention. Method 300 begins at block 302 when the user issues a request for assistance that is received by the user's computer. Control passes to block 304 where the user's computer instantiates, or otherwise invokes, a user interface for providing user assistance. Once the user interface is invoked, control passes to block 306 where user input relative to the assistance request is received. Typically, this request is in the form of a query, but may take any suitable form. Once the query information is received from the user by the computer at block 306, some initial conditions are set, at block 308, relative to the search request. Preferably, the initial conditions set at block 308 are done without the user's knowledge. However, embodiments can be practiced wherein the user explicitly or implicitly sets the initial scope and/or bias. Preferably, the initial conditions set at block 308 are the scope and bias for the assistance search. More preferably, the scope is initially set at the highest, or root level, for the user's local machine. Additionally, the bias is preferably set to be an indication of the current, or latest, software application with which the user has interacted. However, the bias information can also include any suitable information related to or based upon current or recent functions performed by the user on the computer, as well as any other suitable state or variable of the local machine that may bear upon the user's search. Once the initial conditions are set at block 308, control passes to block 310 where the user's local computer determines whether the local computer is operably connected to the first priority search provider listed in the metadata of the content set for the node that corresponds to the initial scope setting. If the user's computer is so connected, control passes to block 312 where the local computer submits the assistance content search to the remote assistance content search provider server. The assistance content search preferably includes the query, scope and bias information. The remote server, as described above, will constrain the assistance content search space of the server's assistance content corpus to that specified by the scope setting in the search request. The server then provides search results in the form of a display preferably within the user interface invoked at block 304. The display of these results is indicated diagrammatically at block 314. If, at block 310, the local machine determines that the first priority search provider specified in the metadata of the top content set node specified by the scope setting, a secondary search provider is used. Typically, the secondary search provider will be disposed on the user's local machine. However, it is expressly contemplated that additional remote assistance servers can be specified at a higher priority than the local machine search provider. If computer 110 is not suitably couplable to a remote assistance server, control passes to block 316 where the assistance content search (in the form of the query, scope and bias) are submitted to the assistance content search provider on the local machine. Once the local machine performs the search, control passes to block 314 where the results are displayed. Once results have been displayed at block 314, the user is provided with an option at block 318, to change the scope of the search. Accordingly, if the user received too many search results, the user may wish to narrow the scope of the search. Additionally, in situations where the initial scope may have been set to a level below the absolute root level of all assistance content, the user may wish to broaden the search by changing the scope level. If the user does not choose to change scope, control passes to block 320 and the method finishes. However, if the user, at block 318 chose to change scope, control returns to block 310 with the new scope setting and the method loops from block 310.

Although the present invention has been described with reference to particular embodiments, workers skilled in the art will recognize that changes may be made in form and detail without departing from the spirit and scope of the invention.

What is claimed is:

1. A computer configured to provide user assistance, the computer comprising:
   a processing unit;
   storage media operable coupled to the processing unit;
   a first software entity stored on the storage media, the first software entity having first assistance content;
   a second software entity stored on the storage media, the second software entity having second assistance content;
   a single hierarchical corpus of assistance content stored on a computer-readable storage medium and comprising the first and second assistance content;
   an assistance engine operably coupled to the single hierarchical corpus of assistance content;
   a user input operably coupled to the processor and disposed to receive a user assistance request;
   wherein the assistance engine is configured to receive scope information defining a level in the single hierarchical corpus of assistance content that is a search space and to receive bias information to influence relevance scores of search results, and wherein the assistance engine is configured to generate an assistance content query based upon the user assistance request over the search space comprising the single hierarchical corpus of assistance content; and
   wherein the bias information is related to a state of the computer, and
   wherein the bias information is indicative of a software entity with which the user is interacting.

2. The computer of claim 1, wherein the scope information is generated automatically.

3. The computer of claim 1, wherein the scope information is changeable by the user.

4. The computer of claim 1, and further comprising a first content set related to the first assistance content, and a second content set related to the second assistance content.

5. The computer of claim 4, wherein the first content set includes metadata indicative of at least one assistance content query handling facility.

6. The computer of claim 5, wherein the at least one assistance content query handling facility includes a plurality of assistance content query handling facilities.

7. The computer of claim 6, wherein at least one of the plurality of assistance content query handling facilities is remote from the computer.

8. A computer implemented method for providing user assistance, the method comprising:
   receiving a user input through a user interface;
   generating scope information relative to the user input;
   providing an assistance content query handling facility that is implemented in program instructions that cause the computer to perform query engine functions;
   providing the user query, scope information defining a level in a single hierarchical corpus of assistance content, and bias information to influence relevance scores of search results of the assistance content query handling facility;
   performing a query with the assistance content query handling facility over a single corpus of assistance content comprising assistance content from a plurality of software entities, wherein the query is limited by the scope information, and wherein the assistance content query handling facility is specified in metadata of a content set related to the scope information; and
   providing assistance content query results to the user.

9. The method of claim 8, and further comprising generating bias information to influence search results based on a state of the user's computer, and providing the bias information to the query handling facility.

10. The method of claim 8, wherein at least one of the plurality of software entities is an operating system.

11. The method of claim 10, wherein at least one of the plurality of software entities is a software application.

12. The method of claim 8, wherein the plurality of software entities comprises first and second software applications.

* * * * *